United States Patent [19]
Randolph

[11] 3,839,797
[45] Oct. 8, 1974

[54] PARALLELING SYSTEM
[76] Inventor: Robert G. Randolph, 4146 Howard, Western Springs, Ill. 60558
[22] Filed: June 14, 1973
[21] Appl. No.: 369,989

[52] U.S. Cl. ............................ 32/67, 32/DIG. 6
[51] Int. Cl. ........................................... A61c 3/00
[58] Field of Search ........................ 32/67, DIG. 6

[56] References Cited
UNITED STATES PATENTS
3,417,471  12/1968  Mitchell ............................... 32/67
3,462,842  8/1969  Greenberg et al. .................. 32/67

*Primary Examiner*—Louis G. Mancene
*Assistant Examiner*—J. Q. Lever
*Attorney, Agent, or Firm*—Davis, McCaleb & Lucas

[57] ABSTRACT

A dental paralleling system in which a Hall Effect sensor is carried by a dental handpiece and magnet is detachably fastened to a patient's set of teeth and so oriented that the lines of force in the magnetic field are parallel to the cutting axes of converging or non-converging base surfaces and cylindrical bores to be prepared in one or more of the set of teeth. During cutting of the base surfaces or drilling of the bores, the Hall Effect sensor is positioned within the field of the magnet. Control means responsive to a Hall Effect potential condition detected in the sensor generates an audible or visible (or both) signal enabling the dentist to guide the cutting tool up and down and from side to side while the Hall Effect sensor remains positioned at some location within the magnetic field and aligned with the magnetic lines of force which are substantially parallel throughout a range of positions enabling the cutting tool to be used on opposite sides of a tooth or on different teeth in the set. By manipulating the dental handpiece to maintain the Hall Effect sensor aligned with these lines of force in response to the signal or signals during the cutting or drilling procedure, the axis of the rotary cutting tool can thereby be kept parallel with these lines of force enabling the dentist to prepare base surfaces on the sides of the teeth which either are parallel or converge in a precisely controlled manner, as desired, for positively supporting crowns and bridges, and enabling the dentist to drill precisely parallel cylindrical bores for receiving supporting pins.

15 Claims, 6 Drawing Figures

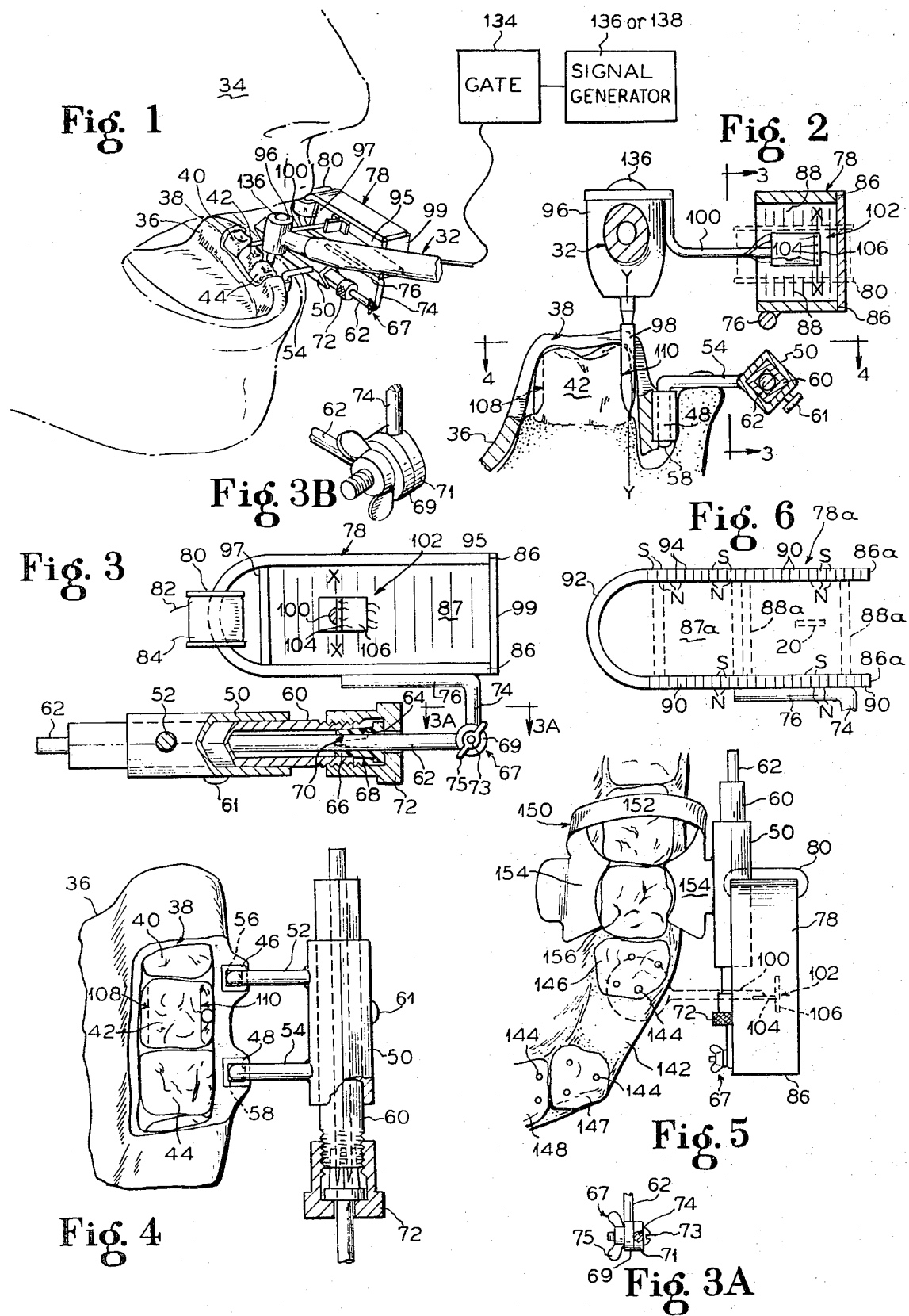

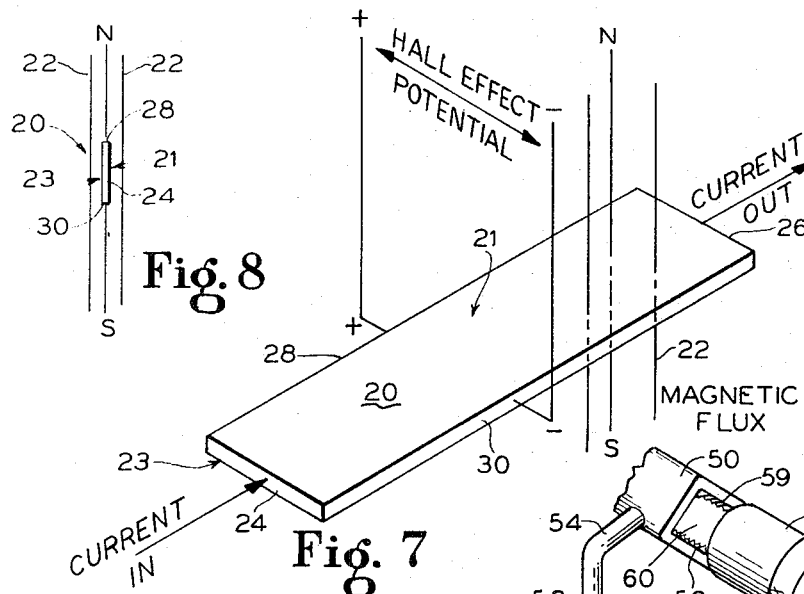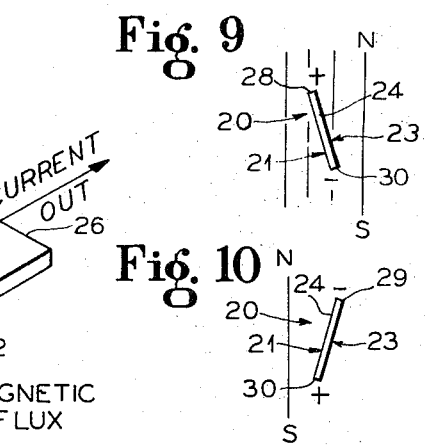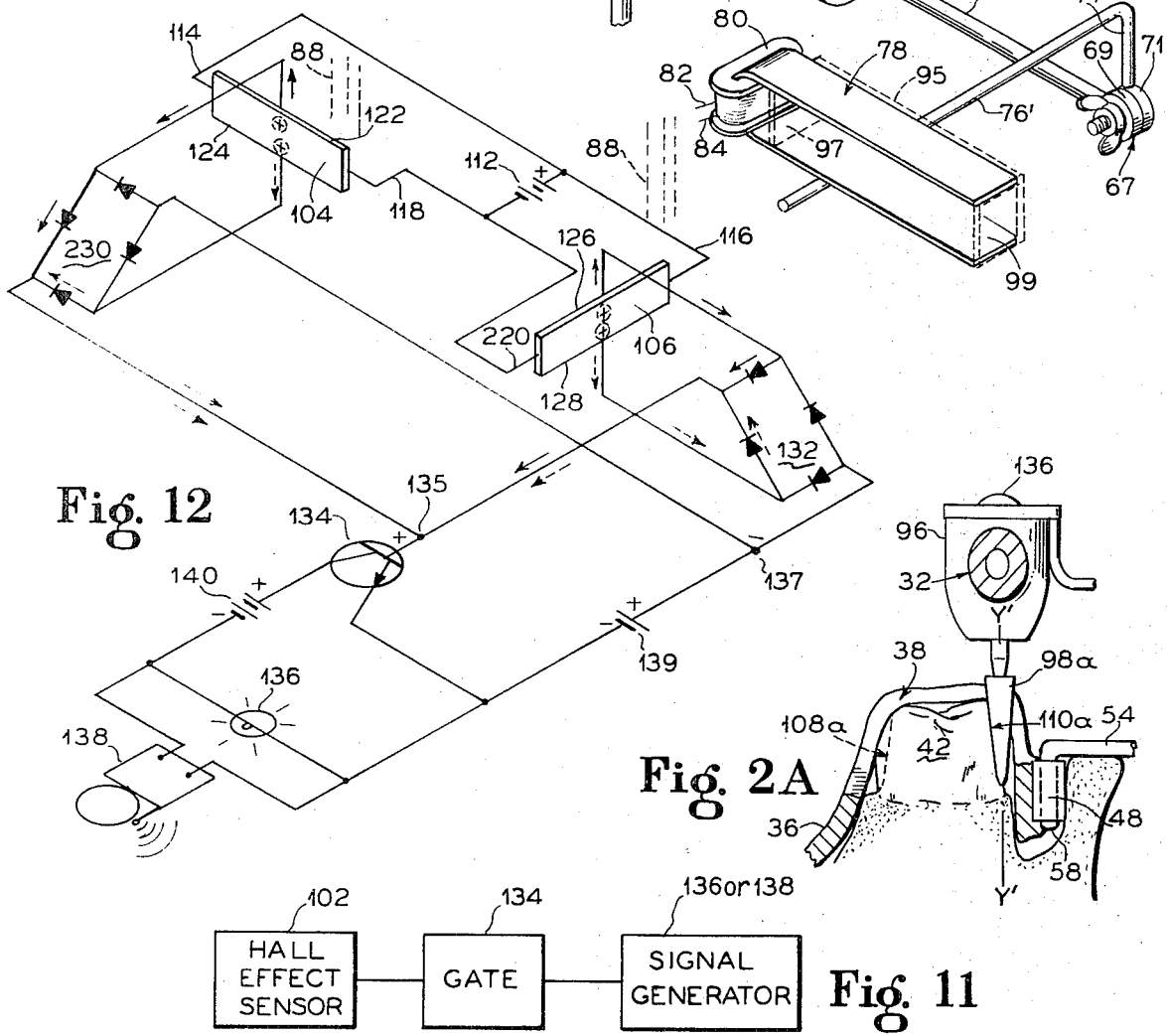

PARALLELING SYSTEM

BACKGROUND OF THE INVENTION

The field of the invention is paralleling systems, and particularly such a system for guiding a dental handpiece to enable preparing either non-converging or precisely controlled converging base surfaces and parallel cylindrical bores in a set of teeth.

An important method of anchoring gold or other metal fillings is by means of small pins or studs placed in parallel bores in one or more teeth, and by fitting crowns, caps and bridges over or between base surfaces which are parallel or have a controlled convergence in an up and down direction.

The making of such bores and base surfaces, however, is difficult because the dentist heretofore has had to guide the handpiece while drilling freehanded and has had to rely solely on his eyesight to keep the working axes parallel during these procedures.

In addition to drilling such parallel cylindrical bores, a dentist also has to cut base surfaces on different sides of a tooth, or on different teeth, which are parallel or have a precise degree of convergence, as mentioned above, for the tight and permanent assembly of caps, crowns and bridges. The freehanded execution of these is very difficult and as a practical matter often results in walls which are non-parallel in an up and down direction, or are excessively undercut or overcut. If the walls so cut converge excessively toward the roots of the tooth, or teeth, it is impossible to make an inlay or crown casting that fits. If the walls are overly convergent, the casting will lack resistance to lateral displacement.

Proposals have been made to hold a dental drill within a mechanical guide sleeve supported on a pivotal and slidable frame fixed to the teeth and which is movable through a range of parallel positions within the patient's mouth. One such device, for example, is disclosed in Jeanneret U.S. Pat. No. 2,224,264 issued Dec. 10, 1940. Such mechanical guide devices have not been satisfactory and therefore have not been adopted to any significant extent because of their inability to maintain a precise mechanical fit in the several pivotal and slidable joints, and because of patient discomfort while supporting all this apparatus in his mouth.

SUMMARY OF THE INVENTION

A general object of the invention is to provide a paralleling system for maintaining a predetermined orientation of a cutting tool relative to a work object in a number of different and not necessarily contiguous or adjacent working positions so that holes may be drilled and base surfaces cut parallel or in predetermined convergence to one another.

A specific object of the invention is to provide a dental paralleling system for preparing controlled converging, non-converging, or parallel base surfaces and cylindrical bores in a set of teeth, the system having a magnet detachably fastened to the set of teeth, a Hall Effect sensor including one or more special conductor or semiconductor strips carried by a dental handpiece and positioned within the field of the magnet when a cutting tool carried by the handpiece is in working position on the teeth, and control means responsive to a Hall Effect potential condition for generating an audible or visible (or both) signal to indicate alignment or non-alignment of the sensor with the lines of force in the magnetic field, thereby enabling the dentist to guide the cutting tool in response to the signal and prepare the base surfaces or drill the cylindrical bores in precise predetermined relationship to one another.

Another object is to provide such a Hall Effect dental paralleling system in which the magnet is supported on an extension externally of the set of teeth.

Another object is to provide such a Hall Effect dental paralleling system in which the magnet is supported in fixed relation to the set of teeth by universally adjustable means enabling the magnet to be fixed in a position where the lines of magnetic force are parallel to the cutting axes of the base surfaces and cylindrical bores to be prepared.

Another object is to provide such a Hall Effect dental paralleling system including control means effective to generate an audible or a visible signal, or both, when the orientation of the cutting tool axis departs from a position of substantial parallelism with the lines of force of the magnet.

Another object is to provide such a Hall Effect dental paralleling system in which a Hall Effect sensor is employed consisting of at least one conductive or semiconductive strip carried by the dental handpiece and positioned normal to the field of a magnet which is supported on the set of teeth either internally or externally of the patient's mouth.

Another object is to provide such a Hall Effect dental paralleling system in which a Hall Effect sensor includes at least two conductive strips at substantially right angles to one another to enable the sensor to be universally responsive to a condition of alignment or misalignment with magnetic lines of force in any direction.

BRIEF DESCRIPTION OF THE DRAWINGS

Other objects and advantages will be apparent from the following description taken in connection with the accompanying drawings in which:

FIG. 1 is a perspective view of a magnet means supported on a set of teeth, and a dental handpiece supporting a Hall Effect sensor within the field of the magnet means utilizing the present invention in performing a dental procedure on side teeth;

FIG. 1A is another form of the invention shown in FIG. 1, illustrating mounting of the magnet means for access to both front and side teeth;

FIG. 2 is an enlarged fragmentary generally vertical cross-sectional view of FIG. 1;

FIG. 2A is a view similar to FIG. 2 showing apparatus for cutting tooth surfaces with controlled convergence using a tapered cutting burr;

FIG. 3 is a fragmentary view of FIG. 2 taken along line 3—3;

FIG. 3A is a fragmentary cross-sectional view of FIG. 3, taken on line 3A—3A;

FIG. 3B is a perspective view of FIG. 3A;

FIG. 4 is a generally horizontal cross-sectional view of FIG. 2 taken along line 4—4;

FIG. 5 is a horizontal sectional view similar to FIG. 4 but taken at a somewhat higher level and illustrating another form of the invention;

FIG. 6 is a view similar to a portion of FIG. 3 illustrating a modified form of magnet means;

FIG. 7 is a schematic illustration of a Hall Effect sensor illustrating the electromagnetic principle on which the present invention is based;

FIGS. 8, 9 and 10 are end views of FIG. 7 showing variations of the Hall Effect potential in response to changes in orientation of the Hall Effect strip with respect to the magnetic field;

FIG. 11 is a block diagram illustrating broadly the major components of the present invention; and FIG. 12 is a schematic diagram based on the block diagram of FIG. 11 illustrating how the paralleling system of the present invention may be employed to enable drilling parallel bores, and cutting non-converging base surfaces in a set of teeth.

Like parts are referred to by like reference characters throughout the figures of the drawings.

DETAILED DESCRIPTION OF THE PREFERRED EMBODIMENTS

The Hall Effect was discovered by Edwin H. Hall (1855–1938), an American physicist, who reported it in a paper entitled "On a New Action of the Magnet on Electric Currents," which appeared in the American Journal of Mathematics, Volume 2, page 287, 1879. The phenomenon described in it is now commonly known as the Hall Effect and is defined in the American Heritage Dictionary as "The generation of an electric potential perpendicular to both an electric current flowing along a thin conducting material and an external magnetic field applied at right angles to the current upon application of the magnetic field."

FIG. 7 illustrates the Hall Effect. If a thin strip 20 of semiconductor material or metal is placed in a magnetic field intersected by lines of force 22, and an electric current flows lengthwise between ends 24 and 26, a voltage differential indicated "Hall Effect potential," occurs across the width of the strip, that is between edges 28 and 30. If either the north-south direction of the magnetic field, or the direction of current through the strip, is reversed from the conditions shown in FIG. 7, the Hall Effect potential across the edges 28, 30 will be reversed. In other words, if the magnetic field is reversed from the condition shown in FIG. 7, the potentials on edges 28 and 30 will change to negative and positive, respectively. The Hall Effect potential across edges 28, 30 will be at a maximum when the strip is at right angles to the lines of force as shown in FIG. 7, and will be zero when the strip is parallel to the lines of force as shown in FIG. 8.

If the strip 20 is rotated slightly counter-clockwise from the vertical position of FIG. 8, to the position of FIG. 9, the edges 28, 30 will become positive and negative as shown in FIG. 7, but the magnitude of the Hall Effect potential will be less than the full value for FIG. 7. If the strip 20 is rotated in the other direction, that is slightly clockwise from the vertical position of FIG. 8, to the position of FIG. 10, the Hall Effect potential will be less than the full value for FIG. 7, but the polarities will be opposite, that is, the edges 28, 30 will become negative and positive as shown.

With the above background to provide a basic understanding of the Hall Effect, the specific application in the dental paralleling system of the present invention will now be described.

A portion of a dental handpiece 32 is illustrated as it would be employed in preparing non-converging, vertically parallel base surfaces or parallel cylindrical bores for the teeth of a patient 34 shown in phantom lines in FIG. 1.

In the embodiment of FIG. 1, a removable supporting tray 36 is formed of quick-setting plastic material cast or otherwise formed and suitably held in place to cover the patient's lower teeth, with an opening 38 exposing the teeth 40, 42 and 44 on which cutting or drilling is to be performed. The tray 36 functions as a mount for a pair of upstanding anchor sleeves 46, 48 embedded therein.

An outer, square cross-section tube 50 has a pair of transverse mounting rods 52, 54 (FIG. 4) with downturned legs 56 and 58 seated respectively in the anchor sleeves 46, 48. An inner, square tube 60 is telescopically assembled within the outer tube 50 and is movable axially back and forth within it while being guided by a snug, low-clearance fit. A set screw 61, acting between square tubes 50 and 60, hold them in relatively adjusted positions.

Within the inner square tube 60 is a round cross-section rod 62 having a snug but slidable fit therein and movable telescopically back and forth as well as rotatably adjustable therein. At the right-hand end, in FIG. 3, the square tube 60 has an inner, flared, square bore 64 within which is seated a similarly externally flared square outer surface 68 of a nylon gland 66. The gland has a round bore 70 which fits snugly about the rod 62. The gland may be split longitudinally in one or more places enabling it to be squeezed inwardly into frictional holding engagement with the rod 62 when the gland is pressed into the flared square bore 60 by tightening a cap 72 which is threadedly engaged with partial screw threads formed on the four outer corners 59 of the tube 60 (see FIGS. 1A and 3).

The rod 62 is telescopically adjustable in and out of the tube 60, and rotatably adjustable therein, and can be held in any so-adjusted position simply by tightening the cap 72. Then, with the angular position of the rod 62 so fixed by the tightened cap, the inner square tube 60 may be further telescopically adjusted back and forth within the outer square tube 50, and held by the set screw 61, without changing the rotatably adjusted position of the rod 62.

At the end of the rod 62 (as shown in FIGS. 3, 3A and 3B) is an outwardly directed rod portion 74 having a folded-back terminal rod section 76 on which is mounted a horseshoe-shaped electromagnet 78 energized by an electrical coil 80 from a source (not shown) through wires 82 and 84.

As shown in FIGS. 3, 3A and 3B, a clamp, generally designated 67, provides angular adjustment between the rod 62 and the outwardly directed rod portion 74. The clamp consists of annular friction rings 69 and 71 fastened respectively to rod portions 62 and 74, and held in frictional engagement by a through-bolt 73 and a wing nut 75. Thus, by loosening the wing nut, the magnet 78 may be set at any desired angle about the axis of bolt 73, and held at the set angle by retightening the wing nut.

When energized, the electromagnet 78 generates a magnetic field 87 between the arms 86, 86 having parallel lines of force 88. An alternate, permanent magnet means 78a is shown in FIG. 6. This comprises a pair of parallel arms 86a on the ends of a curved connecting piece 92. Each arm 86a comprises a series of individual magnetic slugs or bars 90 having their north and south poles facing the same way to reinforce one another and to generate a magnetic field 87a with lines of force 88a. The individual magnetic bars 90 and curved piece 92 may be magnetically isolated from one another by non-magnetic shims 94 such as non-magnetic metal, paper, plastics or the like, and may be fabricated into a U- or horseshoe-shaped assembly by any suitable means such as epoxy cement or solder.

As shown in FIGS. 1 and 3, that portion of the magnetic field where the lines of force 88 are substantially straight and parallel may be defined by a non-magnetic back stop plate 95 and inner and outer non-magnetic end stop plates 97 and 99. These non-magnetic plates may be polymerized methyl methacrylate plastic material ("LUCITE"), or glass, as two examples.

Referring again to the embodiment shown in FIG. 1, the handpiece 32 has a head 96 with a cylindrical cutting burr 98 which is rotatably driven by conventional means (not shown) within the head. An arm 100 is fastened to the head and extends off to the side where it carries a Hall Effect sensor generally designated 102. This includes two Hall Effect strip-like semiconductor elements 104 and 106 each of which is similar to the strip 20 in FIG. 9. As shown in FIGS. 2 and 3, the strips 104 and 106 are fastened to the rod 100 at right angles to each other, and are in planes parallel to the axis Y—Y of cutting burr 98, all of which are parallel to the magnetic lines of force 88 when the handpiece is in the normal operating position.

In casting or forming the tray 36 the anchor sleeves 46 will preferably be placed to support the magnet 78 so the arms 86 are parallel to a plane extending generally along the upper level of the tooth 42 which is illustrated as the one on which the cutting procedure is being performed. The angular disposition of the magnet about the axis of rod 62 is adjustable by turning the magnet while the cap 72 is loosened, and retightening it to hold the magnet in place. Further adjustment of the magnet about the axis of bolt 73 may be made by loosening the wing nut 75, moving the magnet, and retightening the wing nut as above explained.

In the specific example of FIG. 1, the present invention is employed to cut side surfaces 108 and 110 with vertical segments or chords being parallel to the lines of force 88 so that the opposite surfaces on tooth 42 neither converge nor diverge in either vertical direction. The cutting of these surfaces may be guided by any control means which generates audible or visible output signals, or both, in response to the orientation of the Hall Effect sensor 102 within the magnetic field 87 to thereby indicate a condition of parallelism or non-parallelism between the cutting tool axis Y—Y and the lines of force 88. One such control system is shown in the schematic diagram of FIG. 12 where the ends of the Hall Effect strips 104, 106 are connected in parallel with a direct current source such as a battery 112. Specifically, the positive side of the battery 112 is connected to the leads 114 and 116, and negative side is connected to the leads 118 and 120 of the elements 104 and 106, respectively.

As pointed out above, the Hall Effect potential between the edges 28 and 30 of strip 20 is zero when oriented parallel to the lines of force as shown in FIG. 8, and the potential is in opposite directions when the strip is oriented in one way or another as shown in FIGS. 9 and 10. The same is true for the elements 104 and 106 which make up the composite preferred Hall Effect sensor 102. In other words, when the sensor 102 is in the position shown in FIGS. 1, 2, 3 and 4, where both elements 104 and 106 are parallel to the lines of force 88, there will be no Hall Effect potential between the edges 122 and 124 of element 104, or between the edges 126 and 128 of element 106; and in various other orientations, each of the edges 122, 124, 126 and 128 will have a positive potential while the opposite edge of the same element will have a negative potential. These possibilities are indicated in FIG. 12 by the "+" signs shown in broken circles at each edge of the Hall Effect strips.

Referring further to FIG. 12, the edges of the elements 104 and 106 are connected through diode rectifiers generally designated 130 and 132 to the base of an NPN gate transistor 134. Therefore, any time that there is a positive potential on any one of the edges 122, 124, 126 and 128, that potential will be applied through the circuit juncture 135 to the transistor base, and the transistor will be turned on, causing the lamp 136 to be lighted and the buzzer 138 to be activated by the battery 140. This therefore generates both audible and visible output signals indicating non-alignment of the central axis X—X (FIG. 2) of the sensor 102 and the axis Y—Y (FIG. 2) of the cutting burr 98 with the lines of force 88 in the magnetic field.

Coincidentally with a positive potential appearing at the juncture 135, a negative potential will appear at the juncture 137 and will be applied through the biasing battery 139 to the emitter of transistor 134.

Referring again to FIG. 12, the lamp 136 may be located any place where it is readily visible to the dentist during the cutting or drilling procedure, for example at the top of the head 96 as shown in FIGS. 1 and 2. The buzzer 138 may be wall-mounted or it may be in the handpiece itself, for the dentist to feel or hear, or both.

Alternatively, instead of providing a control circuit as shown in FIG. 12 where visible or audible output signals are generated when the axis Y—Y of cutter 98 is non-aligned with the lines of force 88, a control circuit (not shown) may be provided in which the output signals are generated only when the cutter 98 is aligned with the lines of force. Such a modification of the FIG. 12 control circuit would be obvious to one skilled in this art, so no specific alternative illustration is shown in the drawings.

Thus, as shown in the block diagram of FIG. 11, the paralleling system comprises broadly the Hall Effect sensor 102, a gate 134, and a signal generator 136 and 138. When the Hall Effect sensor detects a condition of alignment or misalignment of the cutter 98 relative to the lines of force 88, it opens the gate 134 and activates the signal generator 136 or 138. It should be understood that the circuit of FIG. 12 is intended to be merely a diagrammatic illustration of one general arrangement to show response of a signal generator to an alignment or misalignment condition detected by a Hall Effect sensor. The single transistor 134 is intended only to illustrate the principle of using the relatively small current generated by the Hall Effect strips and triggering the signal generators. In actual practice, high gain transistor arrangements such as a Darlington configuration may be used to provide the signal generating power needed.

An alternative means for mounting the magnet 78 (or 78a) is shown in FIG. 1A where an outwardly directed rod portion 74' extends from the friction ring 71, and this has a horizontal rod portion 76' extending across in front of the patient, supporting the magnet 78 in position to receive the Hall Effect sensor 102 where the handpiece can be used to drill or cut in either side or the front of the set of teeth. Where desired, the magnet may be adjustable (by means not shown) along the horizontal rod portion 76'.

A further alternative means for mounting the magnet 78 (or 78a) is shown in FIG. 5 where a parallel drilling procedure is illustrated in preparation for anchoring a bridge in a first bicuspid position 142 where the tooth is shown as missing. For this purpose, a number of parallel bores 144 will be drilled in neighboring teeth 146, 147 and 148. A spring clamp 150 has a resilient arched portion 152 pressing opposite grip portions 154 into clamped engagement with the first molar 156. A square tube 50 same as described above is fastened as by welding to the outside of the clamp and supports the magnet 78 as above described. For this procedure, the head 96 will be fitted with an end-cutting drill instead of the side-cutting burr shown in FIG. 2. Otherwise the arm 100, sensor 102, magnet 78, and supporting and adjusting means therefor are the same as described above.

Use and operation are believed obvious in view of the preceding detailed description. Briefly, the magnet 78 (or 78a if that embodiment is used) will be adjusted so the lines of force 87 (or 87a) are parallel to a predetermined working axis or direction. In the case of FIG. 2 or 2A, that axis or direction would be parallel to the desired working axis Y—Y for the cylindrical cutter 98 or axis Y'—Y' for the beveled cutter 98a. In the case of FIG. 5, that axis would be parallel to the cylindrical bores 144. To cut the two side surfaces 108 and 110 (FIGS. 2 and 4) parallel, the handpiece 32 will be positioned with the Hall Effect sensor 102 in the field 87 of the magnet 78, between limiting end plates 97, 99 and back plate 95, with the cylindrical cutting burr 98 near the work object, namely the tooth 42. Then, by guiding the handpiece 32 in such a way that the lamp 136 extinguishes and the buzzer deactivates, the dentist knows the cutter axis Y—Y is parallel to the lines of force 88. If the two surfaces 108 and 110 are cut while the lamp and buzzer are off, these surfaces will be parallel (as seen in FIG. 2) to the lines of force 88 and will therefore be neither upwardly nor downwardly divergent or convergent. It will be understood that the surfaces 108 and 110 may have in and out variations from a straight line, as seen in the plan view of FIG. 4, yet they may still be regarded as "parallel" for the present purposes. The paralleling system of this invention enables the dentist to make vertical segments or chords or the surfaces 108 and 110 parallel as seen in FIG. 2 so a crown or bridge may be solidly fitted on them or against them.

Similarly, by substituting a tapered burr cutter 98a for the cylindrical burr cutter 98, the surfaces 108a and 110a may be made, on opposite sides, or all around the tooth so they will have a precisely controlled convergence as shown in FIG. 2A.

In FIG. 5, the individual holes 144 are drilled while the lamp 136 and buzzer 138 are off, thereby assuring they will all be parallel to the lines of force 88 and therefore parallel to each other. Thus, a bridge (not shown) with parallel pins or studs matching the holes 144 can be emplaced with precision and with no unnecessary oversizing of the holes which have to be filled with cement.

An alternative form of Hall Effect sensor may be a single conductor or semiconductor strip 20 operating at a position normal to the lines of force as shown in FIG. 6. By connecting a suitable control circuit (not shown) across the side edges 28 and 30 of that strip, the drill axis Y—Y or Y'—Y' will be at its preferred position when the Hall Effect potential is at some predetermined maximum to which the control circuit can be responsive.

While embodiments of the present invention are disclosed for specific applications in preparing non-converging or selectively-converging base surfaces and parallel cylindrical bores in a set of teeth, it will be understood that various modifications in construction and application may be made within the spirit and scope of the present invention. For example instead of teeth, the paralleling system may be used for cutting non-converging or selectively-converging surfaces and parallel bores in any other work object. Furthermore, while the axis Y—Y of the cutting tool 98, and the axis Y'—Y' of the cutting tool 98a, is each shown at a zero angle of inclination relative to a working axis which would be parallel to the lines of force 88, the cutting tool whether it be a burr cutter or a drill may be at any other selected angle of inclination relative to the working axis or direction. The invention therefore should be limited only by the appended claims.

I claim:

1. In a dental paralleling system for preparing non-converging base surfaces and parallel cylindrical bores in a set of teeth;

magnet means supported in fixed relation with respect to said set of teeth;

a dental handpiece having a rotary cutting tool thereon;

a Hall Effect sensor supported on said handpiece and movably positioned in the field of said magnet means where the magnetic lines of force are substantially straight and parallel when said cutting tool is in a working position on said set of teeth; and control means effective in response to orientation of said Hall Effect sensor within said magnetic field to generate an output signal indicating a condition of alignment of said Hall Effect sensor with said magnetic lines of force;

whereby the axis of said cutting tool can be maintained at a selected angle relative to said parallel magnetic lines of force when preparing said base surfaces and parallel bores by guiding said handpiece to orient said cutting tool in response to said output signal.

2. In a dental paralleling system for preparing non-converging base surfaces and parallel cylindrical bores in a set of teeth, the combination of claim 1 in which:

the axes of said cutting tool and Hall Effect sensor are parallel;

whereby the axis of said cutting tool can be maintained parallel to said magnetic lines of force when preparing said base surfaces and parallel bores by guiding said handpiece in response to said output signal.

3. In a dental paralleling system for preparing non-converging base surfaces and parallel cylindrical bores in a set of teeth, the combination of claim 1 in which:

said magnet means is angularly adjustable relative to said teeth to establish a predetermined direction of movement of said cutting tool parallel to said magnetic lines of force.

4. In a dental paralleling system for preparing non-converging base surfaces and parallel cylindrical bores in a set of teeth;
 magnet means;
 a first supporting means for mounting said magnet means relative to a set of teeth;
 a dental handpiece having a rotary cutting tool thereon;
 a Hall Effect sensor;
 a second supporting means for mounting said Hall Effect sensor on said handpiece positionable in a specific portion of the field of said magnet means where the magnetic lines of force are substantially straight and parallel when said cutting tool is in a working position on said set of teeth;
 means for adjusting said first supporting means to lock said magnet means in position to orient said magnetic lines of force parallel to a predetermined working direction; and
 control means effective in response to orientation of said Hall Effect sensor within said magnetic field to generate an output signal indicating a condition of axial alignment of said sensor with said magnetic lines of force;
 whereby the rotary axis of said cutting tool can be maintained at a selected angle relative to said magnetic lines of force during the preparation of said base surfaces and bores by guiding said handpiece in response to said output signal.

5. In a dental paralleling system for preparing non-converging base surfaces and parallel cylindrical bores in a set of teeth, the combination of claim 4 in which:
 said magnet means includes a pair of parallel arms of opposite magnetic polarity defining a throat with said substantially straight and parallel magnetic lines of force extending between said arms.

6. In a dental paralleling system for preparing non-converging base surfaces and parallel cylindrical bores in a set of teeth, the combination of claim 4 in which:
 said first supporting means includes an elongated member extending between said magnet means and said set of teeth enabling said magnet means to be positioned externally of said set of teeth; and
 said second supporting means includes an elongated member extending between said Hall Effect sensor and said handpiece enabling said sensor to be positioned in the field of said magnet externally of said set of teeth.

7. In a dental paralleling system for preparing non-converging base surfaces and parallel cylindrical bores in a set of teeth, the combination of claim 4 in which said Hall Effect sensor is positioned on said handpiece at an orientation enabling the axis of said rotary cutting tool to be parallel to said magnetic lines of force when the cutting tool is in said working position on said set of teeth.

8. In a paralleling system for maintaining a predetermined orientation of a rotary cutting tool in a plurality of working positions on a work object:
 magnet means supported on said work object;
 a movable member having said rotary cutting tool mounted thereon;
 a Hall Effect sensor supported on said movable member and positioned for movement in the field of said magnet means where the magnetic lines of force are substantially straight and parallel when said cutting tool is in a working position on said work object; and
 control means effective in response to orientation of said Hall Effect sensor within said magnetic field to generate an output signal indicating a condition of alignment of said Hall Effect sensor with said magnetic lines of force;
 whereby the axis of said cutting tool can be maintained at a selected angle relative to said parallel magnetic lines of force when said rotary cutting tool is moved to said plurality of working positions on said work object by guiding said movable member to orient said cutting tool in response to said output signal.

9. In a paralleling system for maintaining a predetermined orientation of a rotary cutting tool in a plurality of working positions on a work object, the combination of claim 8 in which:
 the axes of said cutting tool and Hall Effect sensor are parallel;
 whereby the axis of said cutting tool can be maintained parallel to said magnetic lines of force when said rotary cutting tool is moved to said plurality of working positions on said work object by guiding said movable member to orient said cutting tool in response to said output signal.

10. In a paralleling system the combination of claim 8 in which: said magnet means includes a pair of parallel arms of opposite magnetic polarity defining a throat with said substantially straight and parallel magnetic lines of force extending between said arms.

11. In a paralleling system the combination of claim 8 in which: said Hall Effect sensor includes conductive strip means oriented edgewise to said magnet means parallel to said magnetic lines of force when said cutting tool is in a working position on said work object, and said control means is effective to generate an output signal condition to indicate said edgewise orientation of said strip means.

12. In a paralleling system, the combination of claim 8 in which:
 said Hall Effect sensor comprises a plurality of electrically conductive strips,
 means for directing an electric current lengthwise of each said strip to generate a Hall Effect potential across the edges of said strip; and
 said control means includes means for detecting a Hall Effect potential across any of said strips in response to angular orientation of said sensor within said field of said magnet means, and means for generating said output signal in response to said Hall Effect potential.

13. In a paralleling system, the combination of claim 12 in which said Hall Effect sensor includes two of said electrically conductive strips at substantially right angles to each other.

14. In a paralleling system, the combination of claim 8 in which said magnet means comprises a horseshoe magnet including a pair of parallel arms, each of said arms consisting of a plurality of individual permanent magnets to provide said magnetic lines of force in the throat between said arms.

15. In a paralleling system for maintaining a predetermined orientation of a rotary cutting tool in a plurality of working positions on a work object;
- magnet means supported on said work object;
- a movable member having said rotary cutting tool mounted thereon;
- a magnetic sensor supported on said movable member and positioned for movement in the field of said magnet means where the magnetic lines of force are substantially straight and parallel when said cutting tool is in a working position on said work object; and
- control means effective in response to orientation of said magnetic sensor within said magnetic field to generate an output signal indicating a condition of alignment of said magnetic sensor with said magnetic lines of force;
- whereby the axis of said cutting tool can be maintained at a selected angle relative to said parallel magnetic lines of force when said rotary cutting tool is moved to said plurality of working positions on said work object by guiding said movable member to orient said cutting tool in response to said output signal.

* * * * *